(12) United States Patent
Ben Nun

(10) Patent No.: US 7,042,886 B2
(45) Date of Patent: May 9, 2006

(54) APPARATUS, METHOD, AND COMPUTER PROGRAM FOR WIRE-SPEED CLASSIFICATION AND PRE-PROCESSING OF DATA PACKETS IN AN ATM NETWORK

(75) Inventor: Michael Ben Nun, Ramat Hasharon (IL)

(73) Assignee: P-Cube Ltd., Herzelia (IL)

( * ) Notice: Subject to any disclaimer, the term of this patent is extended or adjusted under 35 U.S.C. 154(b) by 911 days.

(21) Appl. No.: 10/003,416

(22) Filed: Dec. 6, 2001

(65) Prior Publication Data

US 2003/0110284 A1    Jun. 12, 2003

(51) Int. Cl.
*H04L 12/28* (2006.01)

(52) U.S. Cl. .................. 370/397; 370/473
(58) Field of Classification Search .......... 370/395.1, 370/465, 401, 351, 352, 389, 229, 428
See application file for complete search history.

(56) References Cited

U.S. PATENT DOCUMENTS

| | | | |
|---|---|---|---|
| 4,788,656 A | | 11/1988 | Sternberger |
| 5,113,392 A | * | 5/1992 | Takiyasu et al. ............. 370/473 |
| 5,414,702 A | * | 5/1995 | Kudoh ..................... 370/395.7 |
| 5,414,704 A | | 5/1995 | Spinney |
| 5,457,681 A | * | 10/1995 | Gaddis et al. .............. 370/402 |
| 5,617,421 A | | 4/1997 | Chin et al. |
| 5,673,263 A | | 9/1997 | Basso et al. |
| 5,715,250 A | | 2/1998 | Watanabe |
| 5,806,086 A | | 9/1998 | Kimmel et al. |
| 5,842,040 A | | 11/1998 | Hughes et al. |
| 5,898,837 A | | 4/1999 | Guttman et al. |
| 5,946,302 A | | 8/1999 | Waclawsky |
| 5,946,313 A | * | 8/1999 | Allan et al. ................. 370/397 |
| 5,956,721 A | | 9/1999 | Douceur et al. |
| 5,995,488 A | | 11/1999 | Kalkunte et al. |
| 5,995,971 A | | 11/1999 | Douceur et al. |
| 6,041,054 A | | 3/2000 | Westberg |
| 6,104,696 A | | 8/2000 | Kadambi et al. |
| 6,185,208 B1 | | 2/2001 | Liao |
| 6,275,861 B1 | | 8/2001 | Chaudri et al. |

(Continued)

OTHER PUBLICATIONS

High speed datagram delivery over internet using ATM technology by Esaki et al 1995.*

(Continued)

*Primary Examiner*—Seema S. Rao
*Assistant Examiner*—Salman Ahmed
(74) *Attorney, Agent, or Firm*—Abelman, Frayne & Schwab

(57) ABSTRACT

A system that efficiently and effectively monitors Internet protocol (IP) data being transferred in an asynchronous transfer mode (ATM) protocol and provides the information necessary according to a list of specified rules and a method and computer program product therefor are provided. The system allows for opening a process flow associated with the IP data such that the total amount of information about the process flow is reduced and the associated data is promptly recognized as belonging to a specific process flow. The system is capable of directing the data belonging to a certain process flow to an assigned network processor out of a plurality of such processors, while maintaining a balanced load between those processors.

32 Claims, 3 Drawing Sheets

U.S. PATENT DOCUMENTS

| | | |
|---|---|---|
| 6,404,752 B1 | 6/2002 | Allen et al. |
| 6,434,153 B1 | 8/2002 | Yazaki et al. |
| 6,460,120 B1 | 10/2002 | Bass et al. |
| 6,542,508 B1 | 4/2003 | Lin |
| 6,590,894 B1 | 7/2003 | Kerr et al. |
| 6,633,920 B1 | 10/2003 | Bass et al. |
| 6,700,889 B1 | 3/2004 | Nun |
| 2001/0016899 A1 | 8/2001 | Nei |
| 2002/0085563 A1* | 7/2002 | Mesh et al. .................. 370/393 |
| 2002/0122386 A1 | 9/2002 | Calvignal et al. |
| 2002/0165947 A1 | 11/2002 | Akerman et al. |
| 2004/0213222 A1* | 10/2004 | Assa et al. .................. 370/389 |

OTHER PUBLICATIONS

IP Switching: ATM Under IP by Newman et al 1998.*

T.V. Lakshman, et al, High-speed policy-based packet forwarding using efficient multi-dimensional range matching, 1998, ACM SIGCOMM Computer Communication Review, vol. 28, No. 4, pp. 203-214.

Rebecca Thomas, et al, A user guide to the UNIX system, 1985, Obsborne McGraw-Hill, p. 151.

http://developer.intel.com/ial/pbnm, Sep. 2001.

* cited by examiner

APPARATUS, METHOD, AND COMPUTER PROGRAM FOR WIRE-SPEED CLASSIFICATION AND PRE-PROCESSING OF DATA PACKETS IN AN ATM NETWORK

BACKGROUND OF THE INVENTION

1. Field of the Invention

The present invention relates generally to the monitoring and processing of Internet Protocol (IP) data transferred in an asynchronous transfer mode (ATM). More specifically, the present invention relates to the monitoring of data to determine if it complies with a certain set of rules for further processing, depending on the data flow classification, as the data is transmitted through an ATM switch. The application entitled "A Method and Apparatus for Wire-Speed Application Layer Classification of Data Packets" (U.S. patent application Ser. No. 09/547,034, now abandoned) is assigned to a common assignee. The '034 application is herein incorporated by reference for all purposes.

2. Description of the Related Art

Data flows between a network of computers carrying portions of digital information between different nodes. Generally, the results of an application running at one network node may be sent to a computer at another network node. In order to establish the transfer of data, the information is encapsulated in data packets and transmitted over the network. Some communication protocols transfer data packets in a half duplex mode, while others transfer data packets in a full duplex mode.

Two popular ways of transferring Internet Protocol (IP) data between network nodes are the asynchronous transfer mode (ATM) and the Ethernet packet format mode. FIG. 1 describes a network 100 enabling the transfer of data from one Ethernet network 110 to another Ethernet network 110 through an ATM network 120. The Ethernet networks 110 are connected to the ATM network 120 via ATM gateways 130. However, the method used to transfer packets over the Ethernet networks 110 is different from the method used to transfer data over the ATM networks 120. One difference between the two methods is that the data packets (i.e. "ATM cells") in the ATM networks 120 have a fixed size, while the data packets (i.e. "Ethernet packets") in the Ethernet networks 110 vary in size. Another difference is that the ATM cells arrive at their destination in the same order in which they were transmitted from their source, while the Ethernet packets may arrive at their destination out of order.

The ATM is a communication technology designed to address long distance communication at high speeds with different networking systems connected at the end points. Unlike other communications protocols, the ATM transfers cells of data using fixed-length cells, each containing 53 bytes. As shown in FIG. 2, an ATM cell 200 has a 5-byte header 205 and contains a 48-byte payload 210. By using cells 200 having a fixed size, transfer speeds are increased and delay variations are very low. This allows for a dependable performance of the delivery system. The addressing system used for ATM, which was defined by standard committees, depends both on the end system and on the network node to which it is connected. Every network system or node is allocated a 13-byte network address, usually used by the routing protocols, to locate and find a path to a target. The header 205 of the cell 200 contains both a virtual channel identifier (VCI) 215 and a virtual path identifier (VPI) 220 to uniquely identify the channel and path of the cells 200 through the ATM network.

In contrast to the ATM networks 120, Ethernet networks 110 use a scheme based on IP addresses of the data packets to route payloads through a network in accordance with a full duplex protocol. The IP uses a unique identification for a process flow, also known as the IP tuple, which is shown in FIG. 3. Specifically, the IP tuple 300 uniquely identifies a source of a data packet via a 4-byte source IP address 310 and a 2-byte source port 340. Also, the IP tuple 300 uniquely identifies a destination of the data packet by a 4-byte destination IP address 320 and a 2-byte destination port 350. In addition, a 1-byte protocol field 330 defines the protocol type used. Data is transferred over packetized networks, such as an Ethernet, by sending packets of data of variable sizes from a source to a destination, and the packets all have at least the tuple described for identification purposes.

In certain applications the tuple can be extracted from up to 64 bytes. Hence, there are cases where an IP tuple must be split between two ATM cells, as one ATM cell may carry a payload of no more than 48 bytes.

In an Ethernet network, data packets may be monitored for basic qualities in order to apply certain rules regarding such packets. For example, the IP tuple 300 of each data packet may be analyzed to determine the process flow to which it belongs, how the packet should be processed, where the packet should be routed, etc. The application of certain rules to certain data packets ensures a high quality of the transmission of real-time applications such as video or voice over Ethernet, avoids the transmission of restricted applications, and/or applies sets of other rules. However, as higher transmission speeds are required and the number of rules increases, it is essential to design systems that are efficient in handling the stream of packetized data transmitted through the system and that quickly and accurately apply rules to data packets. Since there is a common need to connect between ATM and packetized networks for the purpose of transferring data from one node to another in a mixed network, various ways have been proposed to accomplish this connection. One manner to more efficiently monitor the data in a mixed network is to monitor the IP data when flowing through an ATM node as part of an ATM cell.

While IP data can be classified for purposes of rule checking and enforcing actions by uniquely identifying its characteristics based on information contained in the header, it is essential to extract the header information from the ATM cells. The trivial approach would be to segment and reassemble (SAR) the IP data from the data in each cell. However, although this straightforward approach is simplistic, it requires the reassembly of the entire IP data packet and/or IP tuple, and will degrade the wire-speed performance of the system.

SUMMARY OF THE INVENTION

In an illustrative, non-limiting embodiment of the invention, an apparatus that monitors data transported in ATM cells over an ATM communication network is provided. More specifically, the apparatus monitors IP packets transported over ATM networks.

In another illustrative, non-limiting embodiment of the invention, a method is provided, in which associated packets are recognized and grouped for further packet processing after a classification process, as well as the back annotation to the ATM cells. An important feature of this non-limiting embodiment is that the design allows for scaling the solution in order to efficiently address increasing traffic loads.

In another illustrative, non-limiting embodiment of the invention, a method is provided, in which load is balanced between packet processors, otherwise known as network processors, as well as the specific functionality of the data path and packet classifier units.

BRIEF DESCRIPTION OF THE DRAWINGS

Various aspects of non-limiting embodiments of the present invention will become more apparent by describing such embodiments below in conjunction with the attached drawings, in which.

DESCRIPTION OF THE ILLUSTRATIVE EMBODIMENTS OF THE INVENTION

The following description of the embodiments discloses specific configurations, features, and operations. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, features, and operations of the present invention that would have been known to one skilled in the art are omitted for the sake of clarity and brevity.

Figure 4:
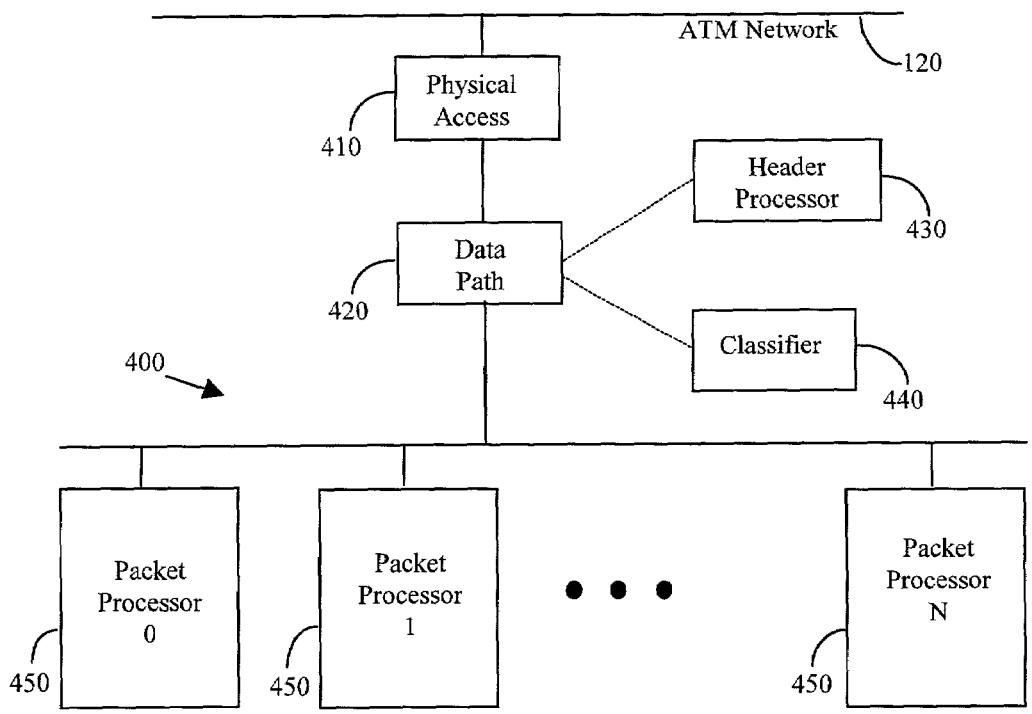
FIG. 4 is a diagram of an illustrative embodiment of an ATM Network Monitoring and Classifying System.

An illustrative embodiment of the present invention may be employed in a policy-based network system shown in FIG. 4. The system 400 is connected to an ATM network 120 through a Physical Access Unit 410, which comprises standard ATM interface components and which captures the data flowing on the high speed ATM network in ATM cells. The cells are processed by a Data Path Unit 420 in conjunction with the operation of a Header Processor 430 and a Classifier 440. The Header Processor 430 and Classifier 440 evaluate each cell and determine, according to predefined rules, whether the operation on the cell should continue. The Data Path Unit 420 reconstructs an IP data packet from the data cells, and if necessary, provides the data to Packet Processors 450 for continued processing. An example of how the data is handled and its association with a process flow are described in detail in the '034 application mentioned above.

Figure 1:
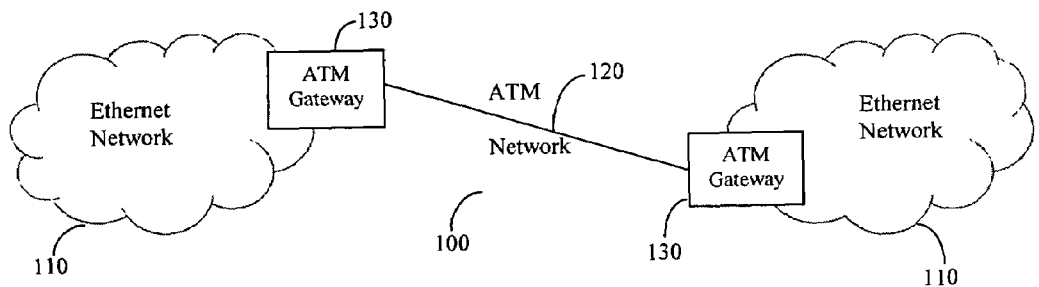
FIG. 1 is a schematic diagram of an example of a connection between Ethernet (packetized) and ATM networks.
Figure 2:
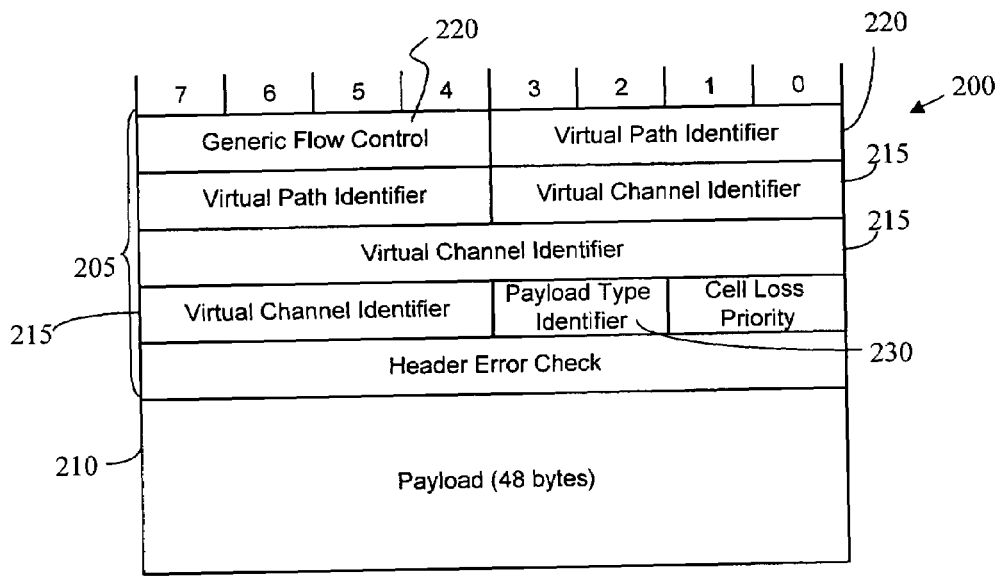
FIG. 2 is an example of an ATM cell format.
Figure 3:
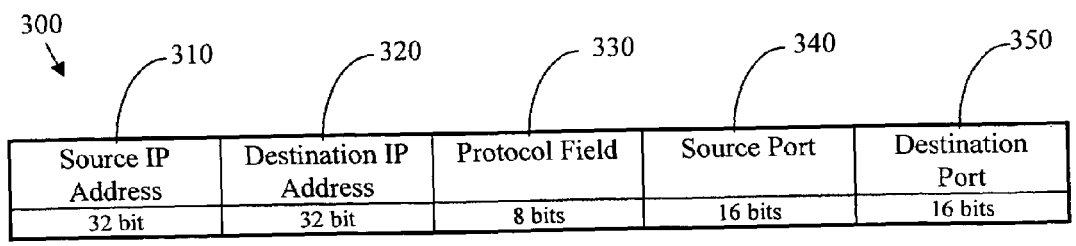
FIG. 3 is an example of an IP tuple.

As will be described in more detail below, the Data Path Unit 420 and the Header Processor 430 may be employed to process data received in an ATM cell format rather than in an IP data packet format. Both the Data Path Unit 420 and Header Processor 430 are capable of ignoring cells that contain data other than IP data. One illustrative manner in which the Data Path Unit 420 and the Header Processor 430 determine whether or not the data in the cell is IP data is to examine the payload type identifier 230 contained within each header 205 of each cell. (See FIG. 2).

Figure 5:
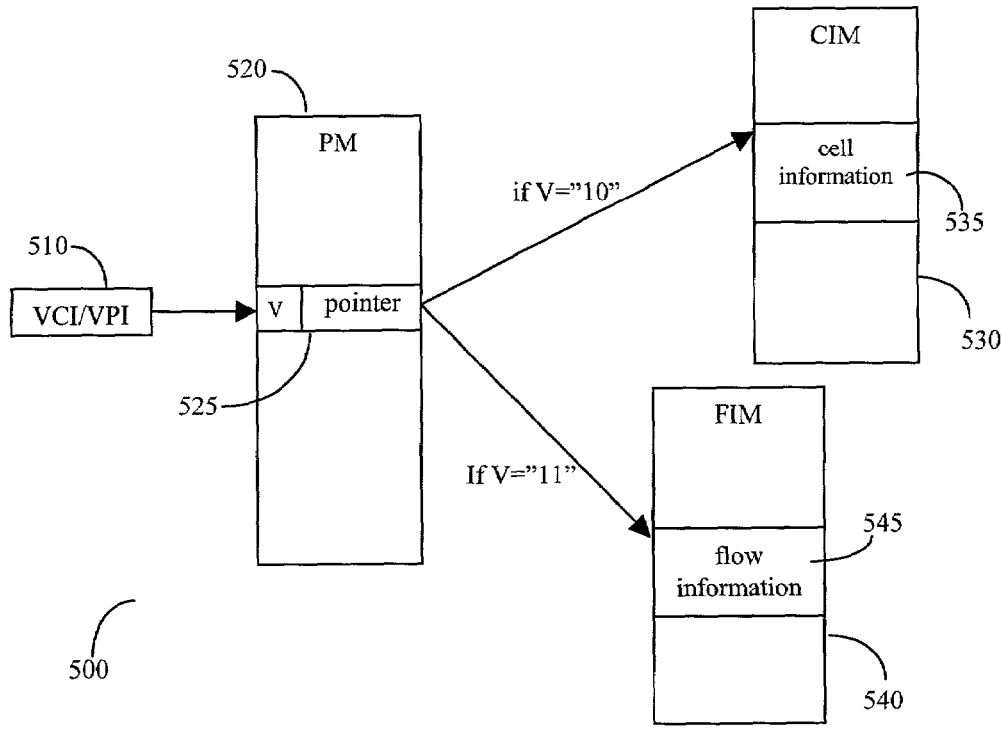
FIG. 5 is a diagram of an illustrative embodiment of a memory assignment scheme for tuple restructuring.

In one implementation of the present embodiment, the Header Processor 430 performs wire-speed assembly of the IP tuple 300 from the ATM cell 200 to determine the remaining operations, if any, to be performed on the cells 200 belonging to an IP packet. One illustrative way to perform such assembly is to allocate certain memory space. For example, as shown in FIG. 5, three portions of memory are provided: Pointer Memory ("PM") 520, Cell Information Memory ("CIM") 530, and Flow Information Memory ("FIM") 540. A pointer 510, which is constructed from the VCI/VPI data 215 and 220 from the ATM cell 200 points to a location 525 in the PM 520 which is unique to the combined value of the VCI/VPI data 215 and 220. The location 525 in the PM 520 contains two fields of information. One field is a validity status field, corresponding to the pointer 510, and the other field is a pointer field that points to another memory location, depending on the content of the validity status field V. The field V may have the following values:

00—invalid pointer
01—saved for future use
10—cell pointer
11—flow pointer

When the validity status field V has the value "00," the data contained in the pointer field may not be used as a pointer and is useless information. When the field V has the value "10," the pointer is used to point to the CIM 530, where the content of the current ATM cell 200 is stored as cell information 535. The storage of the current cell 200 is necessary when the cell 200 does not contain a full IP tuple. When the field V has the value "11," the pointer is used to point to the FIM 540, where the information of the process flow is stored. The value of the field V remains valid until the last cell 200 of the data packet is received. Once the last cell 200 of the data packet is received, as indicated in the cell header 205, the value of the field V is invalidated by resetting it to "00". Failure to reset the field to "00" may result in VCI/VPI data 215 and 220 (i.e. the pointer 510) pointing to the wrong process flow information. However, it is guaranteed that all the cells 200 with the same VCI/VPI data 215 and 220 between the first and last cell 200 all arrive in sequence and all belong to the same data packet. It should be noted that it is possible that cells containing packets with different VCI/VPI addresses 215 and 220 may be flowing through the system at the same time.

An illustrative, non-limiting embodiment of a method of the present invention will now be described.

Figure 6:
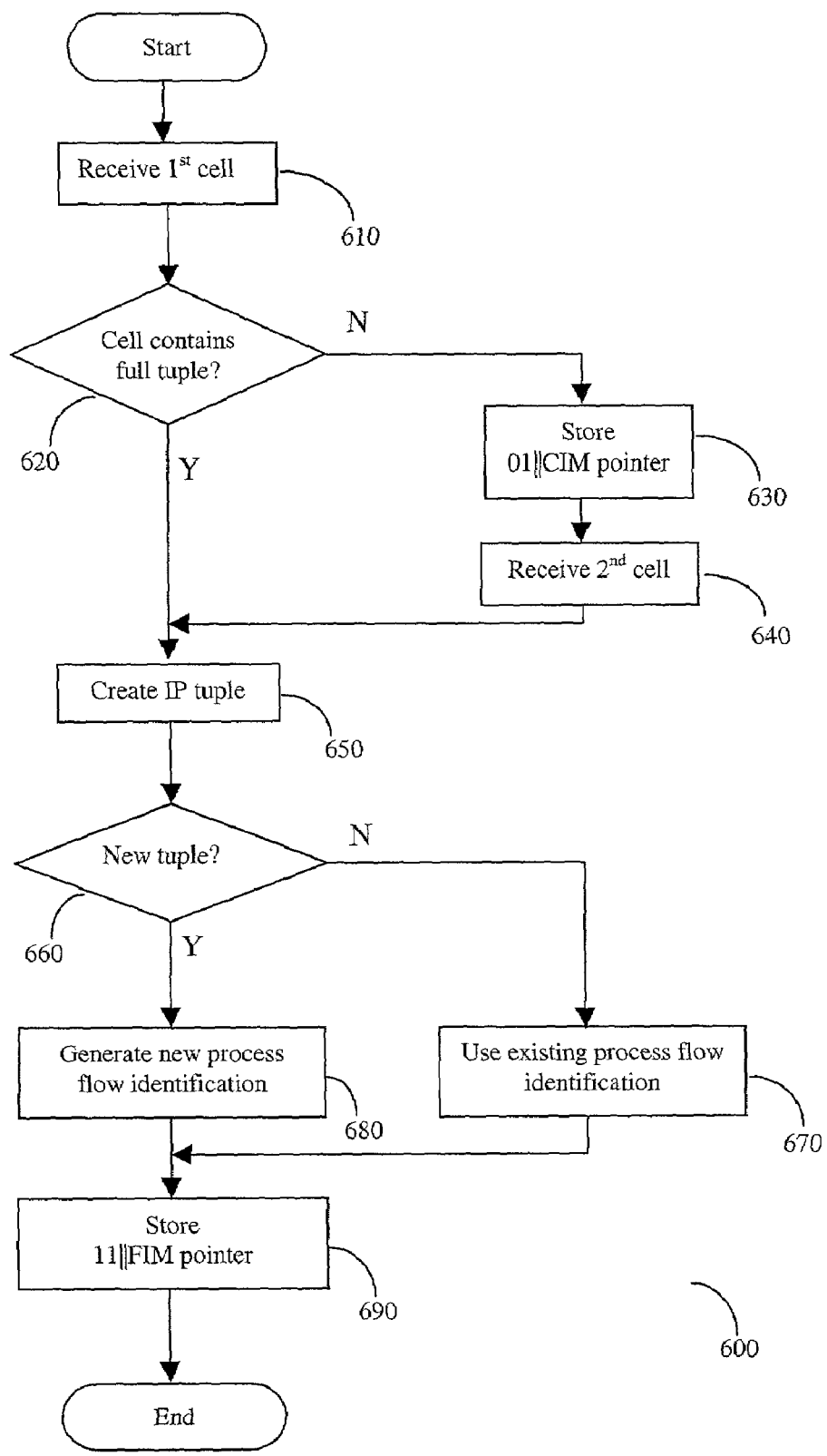
FIG. 6 is a flow chart for an illustrative embodiment of Tuple Extraction from an ATM Cell and Cross Reference.

A current cell 200 is received by the Header Processor 430 as shown in operation 610 of FIG. 6. The cell 200 is checked in operation 620 to determine if it contains a full IP tuple 300, or if it is necessary to wait for the next cell 200 having the same VCI/VPI data 215 and 220 to obtain the rest of the IP tuple 300. If the current cell 200 does not contain a full IP tuple 300, then in operation 630, the payload of the current cell 200 is stored in cell information 535 of the CIM 530, and a pointer 525 in the PM 520 to the cell information 535 is created. The pointer comprises a validity status field V, which equals "10", and a pointer field, which contains the address in the CIM 530 where the cell information 535 is located. In one implementation, the cell information 535 includes the payload 210 of the first cell.

In another illustrative, non-limiting embodiment of the present invention the entire content of the current cell 200 is saved in the CIM 530 at the location pointed to by the pointer field in the PM 520. In operation 640, the Header Processor 430 receives the next cell that contains the second part of the IP tuple 300.

If two cells 200 were necessary to create the full IP tuple 300, (i. e. if operations 630 and 640 were executed) then, in operation 650, the information previously stored in the CIM 530 as the cell information 535 is used in conjunction with the second cell payload 210 to reconstruct the full IP tuple 300. On the other hand, if the IP tuple 300 was contained within the first cell, (i.e. if operations 630 and 640 were not executed) the IP tuple 300 is extracted from the current cell 200.

The IP tuple 300 is then checked to identify whether or not it belongs to a process flow that has already been designated by a process flow identifier (operation 660). If the IP tuple 300 is part of a known flow, the Classifier 440 returns the flow information in operation 670, which includes the Flow-ID, the Packet Processor number and other control/status information. This information is required for the later packet processing and is stored in the FIM 540 as flow information 545. If the IP tuple 300 corresponds to the first data packet of a new process flow, a new process flow entry is generated during operation 680. The information is stored in the FIM 540, and a pointer is created to the stored information during operation 690. The pointer comprises a validity status field V, which equals "11" and a pointer field which contains a pointer to the beginning of the flow information 545. When identified as belonging to a certain flow, the data packet corresponding to the tuple 300 is scheduled to be processed via a designated Packet Processor from the available Packet Processors 450. Then, the data packet is made available to the designated processor via the Data Path Unit 420. The symmetrical and balanced architecture of the system 400 allows for additional Packet Processors 450 to be easily added in order to increase processing bandwidth and, hence, the performance of the entire system 400.

The Data Path Unit 420 operates at full wire speed. Therefore, the Data Path Unit 420 assists the Header Processor 430 in providing indications of how to construct the cells 200, and uses the information provided by the Classifier 440 with respect to the process flow affiliation of a reassembled packet. Moreover, it is beneficial for the overall system performance to ignore the cells 200 that require no reassembly, because the cells 200 that do not require reassembly may contain IP data packets. According to the system rules, these IP data packets may not require any processing, and, hence, it would be wasteful to reassemble them. Therefore, the Header Processor 430 and/or the Classifier 440 may generate commands to the Data Path Unit 420 with instructions on how to handle cells having a certain VCI/VPI data 215 and 220.

Once reassembled, the Data Path Unit 420 performs several consistency checks on each packet, including IP and TCP checksums, IPV4, and legality of packet length. The interface between the Data Path Unit 420 and the plurality of Packet Processors 450 provides the required information for further packet processing.

The operations shown in FIG. 6 may be implemented by software which is executed by the Header Processor 430 shown in FIG. 4. Also, other components shown in FIG. 4 may alternatively or additionally perform some or all of the operations shown in FIG. 6, as well as other operations. Also, the software may be supplied to the Header Processor 430 and/or other components via a read only memory ("ROM"), a random access memory ("RAM"), a floppy disk, a hard disk, an optical disk, a carrier wave (e.g. a carrier wave transmitted via the internet, a vertical blanking interval of a television signal, etc.), or any other computer readable medium.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A network interface that processes data cells transmitted on a network operating in asynchronous transfer mode (ATM), comprising:

a data path unit that inputs said data cells transmitted on said network;

a header processor that inputs a first data cell of said data cells from said data path unit and determines whether or not a full tuple can be created based on said first data cell; and a pointer memory that contains a pointer and a validity indicator, wherein said pointer points to another memory location which stores information corresponding to at least a portion of said full tuple and said validity indicator identifies a characteristic of said pointer, wherein, if said full tuple can be created based on said first data cell, said header processor constructs said full tuple based on said first data cell and outputs said full tuple, wherein, if said full tuple cannot be created based on said first data cell, said header processor inputs a second data cell of said data cells from said data path unit, constructs said full tuple based on said first data cell and said second data cell, and outputs said full tuple, wherein said data path unit creates a data packet corresponding to said full tuple, wherein, when said validity indicator corresponds to valid pointer data, said pointer points to a first memory location when said valid pointer data has a first value and points to a second memory location when said valid pointer data has a second value, and wherein said second memory location contains process flow information corresponding to a process flow of said data packet.

2. The network interface of claim 1, wherein said process flow information is stored in said second memory location and said valid pointer data has said second value after said full tuple has been created.

3. A method for classifying Internet protocol (IP) packets transferred in data cells over an asynchronous transfer mode (ATM) network, comprising:

(a) determining if a first data cell contains a full IP tuple;

(b) creating said full IP tuple from said first data cell if said first data cell contains said full IP tuple;

(c) classifying said full IP tuple in accordance with process flow information after said full IP tuple is created;

(d) determining a first pointer based on a virtual channel identifier/virtual path identifier (VCI/VPI) contained in said first data cell;

(e) storing a second pointer and validity data in a first memory location, wherein said first pointer points to said first memory location;

(f) storing said process flow information in a second memory location, wherein said second pointer points to said second memory location after said full IP tuple is created;

(g) obtaining an IP packet corresponding to said full IP tuple; and (h) determining operations to be performed on said IP packet based on said process flow information.

4. The method of claim 3, further comprising:
(i) storing a payload of said first data cell in a third memory location if said first data cell does not contain said full IP tuple.

5. The method of claim 4, further comprising:
(j) when said first data cell does not contain said full IP tuple, pointing said second pointer to said third memory location after receiving said first data cell and before said full IP tuple is created; and
(k) when said first data cell does not contain said full IP tuple, setting said validity data to indicate that said second pointer points to said third memory location after receiving said first data cell and before said full IP tuple is created.

6. The method of claim 5, further comprising:
(l) reading a second data cell if said first data cell does not contain said full IP tuple, wherein, said operation (l) is performed after said operation (j).

7. The method of claim 6, further comprising:
(m) creating said full IP tuple from at least said first cell and said second data cell when said first data cell does not contain said full IP tuple.

8. The method of claim 7, further comprising:
(n) setting said validity indicator to indicate invalidity of said second pointer when a last data cell corresponding to said IP packet is received.

9. The method of claim 3, further comprising:
(i) setting said validity indicator to indicate invalidity of said second pointer when a last data cell corresponding to said IP packet is received.

10. The method of claim 3, further comprising:
(i) setting said validity indicator to indicate that said second pointer points to said second memory location after said first tuple is created.

11. A method for classifying Internet protocol (IP) packets transferred in data cells over an asynchronous transfer mode (ATM) network, comprising:
(a) receiving a first ATM cell;
(b) determining if said first ATM cell comprises a full IP tuple;
(c) if said first ATM cell comprises said full IP tuple, creating said full IP tuple from said first ATM cell;
(d) determining if said full tuple corresponds to an existing process flow;
(e) if said full tuple does not correspond to an existing process flow, generating new process flow information as particular process flow information;
(f) if said full tuple corresponds to an existing process flow, determining that existing process flow information corresponds to said particular process flow information
(g) storing said particular process flow information in a first memory location;
(h) creating a first pointer from a virtual channel identifier/virtual path identifier (VCI/VPI) contained in said first ATM cell, wherein said first pointer at least indirectly points to said first memory location; and
(i) storing a second pointer in a second memory location. wherein said second pointer comprises a validity field and points to said first memory location after said full IP tuple is created, and
wherein said first pointer points to said second memory location.

12. The method as claimed in claim 11, wherein said operation (c) comprises:
(c1) if said first ATM cell comprises said full IP tuple, creating said full IP tuple from said first ATM cell;
(c2) if said first ATM cell does not comprise said full IP tuple, receiving a second ATM cell; and
(c3) after receiving said second ATM cell, if said first ATM cell and said second ATM cell comprise said full P tuple, creating said full IP tuple from said first ATM cell and said second ATM cell.

13. The method as claimed in claim 11, wherein said validity field indicates that said second pointer points to said particular process flow information after said full IP tuple is created, and
wherein said validity field indicates that said second pointer is invalid after a last data packet corresponding to said full IP tuple has been received.

14. The method as claimed in claim 12, further comprising:
(g) when said first ATM cell does not comprise said full IP tuple, storing information corresponding to said first ATM cell in a first memory location after said first ATM cell is received and before said full IP tuple is created,
(h) creating a first pointer from a virtual channel identifier/virtual path identifier (VCI/VPI) contained in said first ATM cell corresponding to said full IP tuple, wherein said first pointer at least indirectly points to said first memory location after said first ATM cell is received and before said full IP tuple is created.

15. The method as claimed in claim 14, further comprising:
(i) storing a second pointer in a second memory location,
wherein said second pointer comprises a validity field and points to said first memory location after said first ATM cell is received and before said full IP tuple is created,
wherein said first pointer points to said second memory location, and
wherein, after said first ATM cell is received and before said full IP tuple is created, said validity field indicates that said first memory location comprises said information corresponding to said first ATM cell.

16. The method as claimed in claim 15, further comprising:
(j) storing said particular process flow information in a third memory location,
wherein said validity field indicates that said second pointer points to said third memory location after said full IP tuple is created.

17. The method as claimed in claim 16, wherein said validity field indicates that said second pointer is invalid after a last data packet corresponding to said full IP tuple has been received.

18. Software contained in a computer readable medium, wherein said software comprises instructions to instruct a processor for performing operations, comprising:
(a) determining if a first data cell in an asynchronous transfer mode (ATM) network contains a full Internet protocol (IP) tuple;
(b) creating said full IP tuple from said first data cell if said first data cell contains said full IP tuple;
(c) classifying said full IP tuple in accordance with process flow information after said full IP tuple is created;
(d) determining a first pointer based on a virtual channel identifier/virtual path identifier (VCI/VPI) contained in said first data cell;
(e) storing a second pointer and validity data in a first memory location, wherein said first pointer points to said first memory location;

(f) storing said process flow information in a second memory location, wherein said second pointer points to said second memory location after said full IP tuple is created;

(g) obtaining an IP packet corresponding to said full IP tuple; and (h) determining operations to be performed on said IP packet based on said process flow information.

19. The software of claim 18, wherein said operations further comprise:

(i) storing a payload of said first data cell in a third memory location if said first data cell does not contain said full IP tuple.

20. The software of claim 19, wherein said operations further comprise:

(j) when said first data cell does not contain said full IP tuple, pointing said second pointer to said third memory location after receiving said first data cell and before said full IP tuple is created; and (k) when said first data cell does not contain said full IP tuple, setting said validity data to indicate that said second pointer points to said third memory location after receiving said first data cell and before said full IP tuple is created.

21. The software of claim 20, wherein said operations further comprise:

(l) reading a second data cell if said first data cell does not contain said full IP tuple, wherein, said operation (l) is performed after said operation (j).

22. The software of claim 21, wherein said operations further comprise:

(m) creating said full IP tuple from at least said first cell and said second data cell when said first data cell does not contain said full IP tuple.

23. The software of claim 18, wherein said operations further comprise:

(i) setting said validity indicator to indicate invalidity of said second pointer when a last data cell corresponding to said IP packet is received.

24. The software of claim 22, wherein said operations further comprise:

(n) setting said validity indicator to indicate invalidity of said second pointer when a last data cell corresponding to said IP packet is received.

25. The software of claim 18, wherein said operations further comprise:

(i) setting said validity indicator to indicate that said second pointer points to said second memory location after said first tuple is created.

26. Software contained in computer readable medium, wherein said software comprises instructions to instruct a processor for performing operations, comprising:

(a) receiving a first ATM cell;

(b) determining if said first ATM cell comprises a full IP tuple;

(c) if said first ATM cell comprises said full IP tuple, creating said full IP tuple from said first ATM cell;

(d) determining if said full tuple corresponds to an existing process flow;

(e) if said full tuple does not correspond to an existing process flow, generating new process flow information as particular process flow information;

(f) if said full tuple corresponds to an existing process flow, determining that existing process flow information corresponds to said particular process flow information;

(g) storing said particular process flow information in a first memory location;

(h) creating a first pointer from a virtual channel identifier/virtual path identifier (VCI/VPI) contained in said first ATM cell, wherein said first pointer at least indirectly points to said first memory location; and (i) storing a second pointer in a second memory location, wherein said second pointer comprises a validity field and point to said first memory location after said full IP tuple is created, and wherein said first pointer points to said second memory location.

27. The software as claimed in claim 26, wherein said operation (c) comprises:

(c1) if said first ATM cell comprises said full IP tuple, creating said full IP tuple from said first ATM cell;

(c2) if said first ATM cell does not comprise said full IP tuple, receiving a second ATM cell; and (c3) after receiving said second ATM cell, if said first ATM cell and said second ATM cell comprise said full IP tuple, creating said full IP tuple from said first ATM cell and said second ATM cell.

28. The software as claimed in claim 26, wherein said validity field indicates that said second pointer points to said particular process flow information after said full IP tuple is created, and wherein said validity field indicates that said second pointer is invalid after a last data packet corresponding to said full IP tuple has been received.

29. The software as claimed in claim 27, wherein said operations further comprise:

(g) when said first ATM cell does not comprise said full IP tuple, storing information corresponding to said first ATM cell in a first memory location after said first ATM cell is received and before said full IP tuple is created, (h) creating a first pointer from a virtual channel identifier/virtual path identifier (VCI/VPI) contained in said first ATM cell corresponding to said full IP tuple, wherein said first pointer at least indirectly points to said first memory location after said first ATM cell is received and before said full IP tuple is created.

30. The software as claimed in claim 29, wherein said operations further comprise:

(i) storing a second pointer in a second memory location, wherein said second pointer comprises a validity field and points to said first memory location after said first ATM cell is received and before said full IP tuple is created, wherein said first pointer points to said second memory location, and wherein, after said first ATM cell is received and before said full IP tuple is created, said validity field indicates that said first memory location comprises said information corresponding to said first ATM cell.

31. The software as claimed in claim 30, wherein said operations further comprise:

(j) storing said particular process flow information in a third memory location, wherein said validity field indicates that said second pointer points to said third memory location after said full IP tuple is created.

32. The software as claimed in claim 31, wherein said validity field indicates that said second pointer is invalid after a last data packet corresponding to said full IP tuple has been received.

* * * * *